(12) United States Patent
Alderson et al.

(10) Patent No.: US 6,669,347 B2
(45) Date of Patent: Dec. 30, 2003

(54) WINDOW BAFFLES

(75) Inventors: Timothy Alderson, Winter Spring, FL (US); William H. Barrow, Clemont, FL (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 10/125,360

(22) Filed: Apr. 19, 2002

(65) Prior Publication Data

US 2003/0197942 A1 Oct. 23, 2003

(51) Int. Cl.$^7$ .............................................. G02B 27/00
(52) U.S. Cl. ...................... 359/614; 359/615; 359/601; 359/609
(58) Field of Search .................................. 359/614, 615, 359/601, 609, 399, 738; 118/712, 715

(56) References Cited

U.S. PATENT DOCUMENTS

| | | | |
|---|---|---|---|
| 4,297,989 A | * 11/1981 | Wozny et al. ............... | 126/648 |
| 4,362,364 A | 12/1982 | Smith | |
| 4,435,828 A | 3/1984 | Epstein et al. | |
| 4,542,963 A | 9/1985 | Linlor | |
| 4,813,469 A | * 3/1989 | Scott ......................... | 160/178.2 |
| 5,093,837 A | 3/1992 | Edwards | |
| 5,187,939 A | 2/1993 | Skertic et al. | |
| 5,231,378 A | 7/1993 | Dennis et al. | |
| 5,341,392 A | * 8/1994 | Warner et al. ................ | 372/62 |
| 5,371,369 A | 12/1994 | Kent | |
| 5,764,274 A | 6/1998 | Sousa et al. | |
| 5,986,828 A | 11/1999 | Wood et al. | |
| 6,024,458 A | 2/2000 | Lundgren | |
| 6,028,671 A | 2/2000 | Svetkoff et al. | |
| 6,042,650 A | 3/2000 | Uesugi et al. | |
| 6,203,657 B1 | * 3/2001 | Collison et al. ........ | 156/345.48 |
| 6,312,593 B1 | * 11/2001 | Petrie ......................... | 210/205 |

* cited by examiner

*Primary Examiner*—Mohammad Sikder
(74) *Attorney, Agent, or Firm*—Burns, Doane, Swecker & Mathis, LLP

(57) ABSTRACT

A window baffle assembly has a multi-element segmented window having a first surface adapted to receive at least one wavelength of radiation from an optical system, a baffle housing positioned proximate at least a portion of the first surface of the segmented window, and a plurality of baffle elements each affixed between positions on the baffle housing and offset from the first surface of the window. At least a portion of the plurality of baffle elements are in a Field of View of the optical system at an operational angle. The surface of the baffle elements are adapted to absorb at least a portion of the energy of the radiation and oriented to scatter the radiation. Each baffle element comprises a leading edge and an opposing trailing edge, the leading edge oriented toward the first surface of the window and the trailing edge oriented to point toward a central point of the optical system. A method of manufacturing a window baffle assembly is also provided.

15 Claims, 9 Drawing Sheets

WINDOW BAFFLES

BACKGROUND

1. Field of the Invention

The present invention is directed generally to a window baffle. More specifically, the present invention is directed to a window baffle in an active laser system that absorbs and scatters energy, such as from secondary reflections, while causing minimal impact to system performance.

2. Background Information

Segmented windows exhibit desirable aerodynamic performance characteristics as well as low observable capabilities. In order to achieve these qualities, a window, such as a Forward Looking Infrared Radar (FLIR) window, is generally not flat and facing forward, but rather has multiple facets or segments. However, at least two effects have impacted the use of multiple segmented windows.

First, the seams at the interface of each segment in a segmented window deleteriously impact the optical performance. The effects of the seams can be minimized through the use of small joints and by engineering, for example, engineering the window to take advantage of optical properties such as Snell's Law of Refraction to reduce the impact on optical performance.

Second, the effects of secondary reflections from one face to another can be significant. For example, in systems with active laser elements, the use of a segmented window design has been shown to cause stray energy loss in excess of the eye-safe requirement for that laser. Secondary reflections from a laser source can be significantly powerful even with an anti-reflective (AR) coating.

Attempts to attenuate the secondary reflections in such systems have been made. For example, U.S. Pat. No. 6,042,650 discloses a baffle system to block radiation from a laser source due to reflections and scattering. Similarly, U.S. Pat. No. 4,542,963 discloses the use of baffles to prevent stray radiation from the reflections on the side of a telescope.

Previous baffle systems have suffered from negatively impacting the available Field of View (FOV) of the optical system in which they are used. This occurs when, for example, the window is physically blocked to prevent stray energy from leaving the system. Designs of previous window baffles have attempted to balance the required need for reduced internal reflections in a system with the need to maximize the FOV. In general, this balancing has resulted in at least some reduction in the FOV.

Therefore, it is desirable to reduce internal reflections in an optical system while maintaining the maximum FOV of the optical system.

SUMMARY OF THE INVENTION

An exemplary embodiment of a window baffle assembly has a multi-element segmented window having a first surface adapted to receive at least one wavelength of radiation from an optical system, a baffle housing positioned proximate at least a portion of the first surface of the segmented window, and a plurality of baffle elements each affixed between positions on the baffle housing and offset from the first surface of the window. Each baffle element comprises a leading edge and an opposing trailing edge, the leading edge oriented toward the first surface of the window. The plurality of baffle elements are in a Field of View of the optical system at an operational angle.

The surface of the baffle elements are adapted to absorb at least a portion of the energy of the radiation and oriented to scatter the radiation. In an exemplary embodiment, the surface of the baffle element has a desired surface roughness to scatter the radiation. In another exemplary embodiment, the trailing edge of the baffle elements are oriented to point toward a central point of the optical system.

A portion of the leading edge of each baffle element is affixed to the baffle housing. In an exemplary embodiment, the window baffle assembly has a reinforcing element joined to each of the baffle elements and to the baffle housing. The reinforcing element can be joined to each baffle element between the positions at which the baffle elements are affixed to the baffle housing.

An exemplary embodiment of a window baffle assembly has a window having a first surface and a second surface, the first surface opposing an aperture of an optical system for transmitting and receiving radiation and a plurality of baffle elements arranged on the first surface of the window such that at least a first wavelength of radiation is transmitted from the optical system through the baffle elements and the window and at least a second wavelength is transmitted through the window and the baffle elements to the optical system. At least a portion of the baffle elements are in a Field of View of the optical system and each has a trailing edge oriented toward a central point of the optical system such that the baffle elements scatter or absorb at least a portion of the first wavelength and a portion of the second wavelength.

A method of manufacturing a window baffle assembly comprises the steps of determining a plurality of reflections associated with a first wavelength of radiation, forming a plurality of baffle elements having a length from a leading edge to a trailing edge, and positioning a plurality of baffle elements proximate a first surface of at least a portion of a window such that the trailing edge of each baffle element overlaps the leading edge of an adjacent baffle element by at least a predetermined percentage of the distance from the leading edge to the trailing edge. The plurality of baffle elements are positioned such that each is oriented to scatter incident radiation while a mean transmission loss is less than 25%. The method can further comprise a step of joining a center section of each of the plurality of baffle elements with a reinforcing element such that a deflection distance of any one baffle element is no greater than a predetermined value. Still further, the method can comprise a step of affixing the baffle elements to a baffle housing about a perimeter of the window.

The surface of the baffle elements can be adapted to absorb at least a portion of the energy of the radiation incident thereon. For example, the surface can be coated with an energy absorbing coating and/or roughened to a predetermined surface roughness.

BRIEF DESCRIPTION OF THE DRAWING FIGURES

Other objects and advantages of the invention will become apparent from the following detailed description of preferred embodiments in connection with the accompanying drawings in which like numerals designate like elements and in which.

DETAILED DESCRIPTION OF THE PREFERRED EMBODIMENTS

Figure 1:
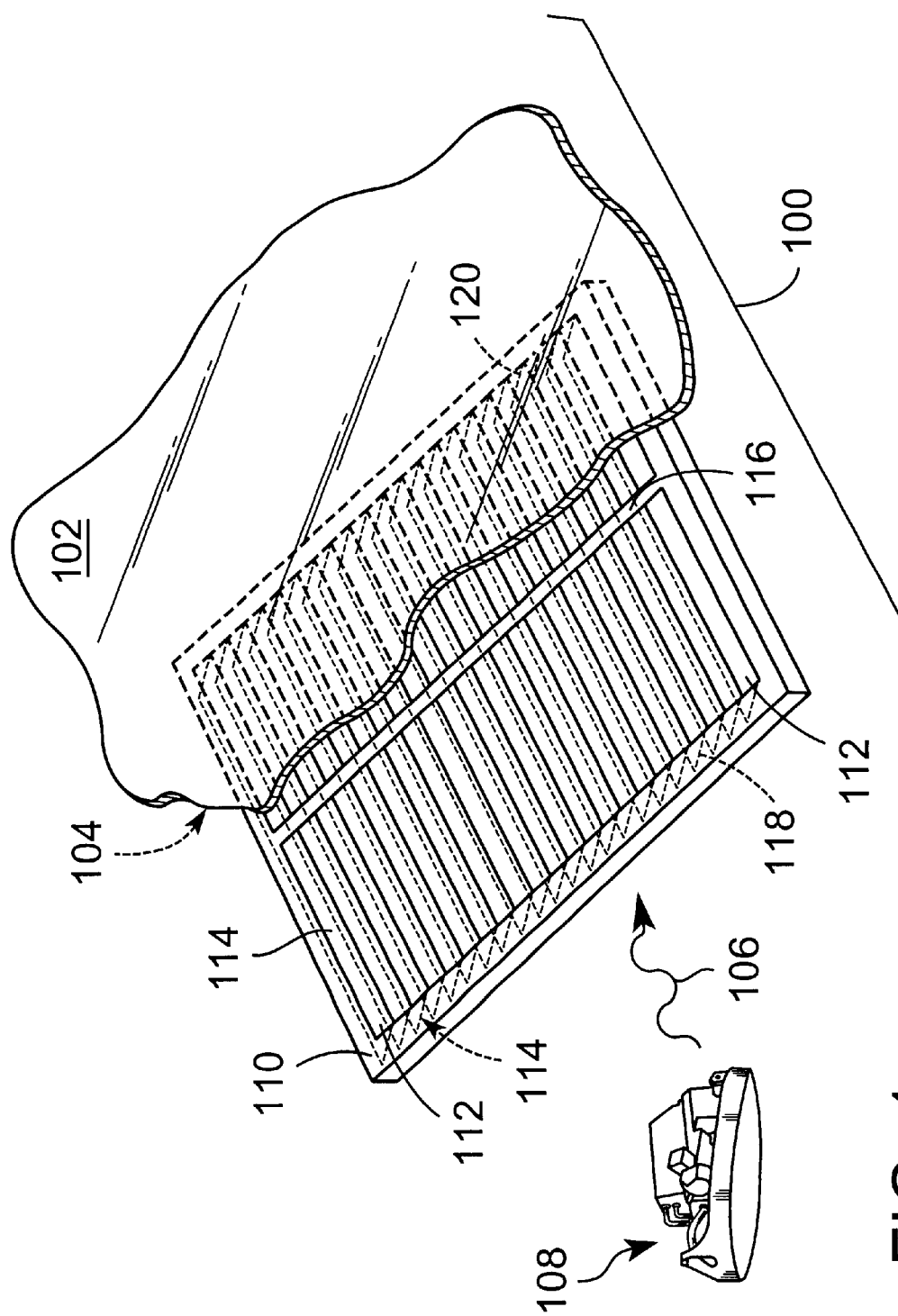
FIG. 1 is an expanded perspective view of an exemplary embodiment of a window baffle assembly in a window.

FIG. 1 shows an expanded perspective view of an exemplary embodiment of a window baffle assembly. The window baffle assembly, represented by 100, comprises a window, such as a multi-element segmented window 102, with a first surface 104 adapted to receive at least one wavelength of radiation, such as ray of light 106, from an optical system, such as Forward Looking Infrared Laser (FLIR) system 108, a baffle housing 110 positioned proximate at least a portion of the first surface of the window 102, and a plurality of baffle elements 112 each affixed between positions on the baffle housing 110 and offset from the first surface 104 of the window 102. Each baffle element has a surface 114 adapted to absorb at least a portion of the energy of the radiation, such as radiation incident thereon, and oriented to scatter the radiation, such as radiation incident thereon.

In another exemplary embodiment of a window baffle assembly, a window has a first surface and a second surface and a plurality of baffle elements arranged on the first surface of the window such that at least a first wavelength of radiation is transmitted from the optical system through the baffle elements and the window and at least a second wavelength is transmitted through the window and the baffle elements to the optical system. The first surface of the window opposes an aperture of an optical system for transmitting and receiving radiation and each baffle element is in a Field of View of the optical system and has a trailing edge oriented toward a central point of the optical system such that the baffle elements scatter or absorb at least a portion of the first wavelength and a portion of the second wavelength.

Figure 2:
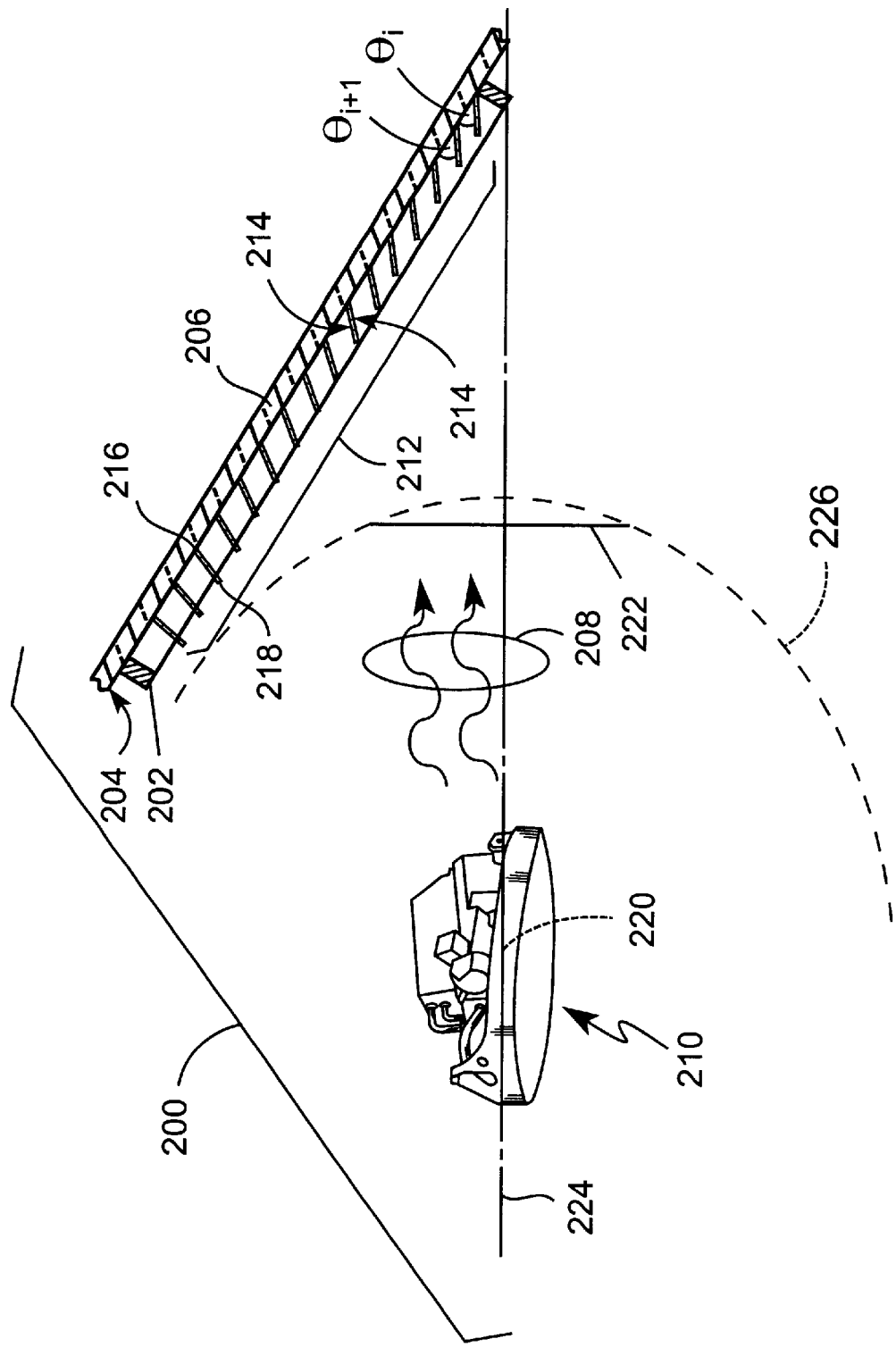
FIG. 2 is a simple schematic cross-sectional view of an exemplary window baffle assembly.

FIG. 2 shows a simple cross-sectional schematic view of an exemplary embodiment of a window baffle assembly, represented by 200. A baffle housing 202 is positioned proximate a first surface 204 of a window 206. The first surface 204 is adapted to receive at least one wavelength of radiation, such as a plurality of rays of light 208, from an optical system, such as FLIR 210. The optical system is positioned on the first surface 204 side of the window 206 with the first surface 204 opposing the aperture of the optical system. The baffle housing 202 has a plurality of baffle elements 212. At least a portion of the baffle elements are in the field of view of the optical system.

The baffle housing is adapted to be positioned proximate a surface of a window or a portion of the window. For example, where the window is a multi-element segmented window, the baffle housing can be positioned proximate at least a portion of the segmented window or a portion of one segment of the segmented window, several segments of the segmented window, or the entire segmented window. Further, the baffle housing can be positioned proximate the window and associated with or in a particular field of view of the window (e.g., an upper field of view, a lower field of view, a forward field of view, a rear field of view, or combinations thereof).

The baffle housing can be held in position relative to the window by any suitable means. For example, the baffle housing can be epoxied, soldered, brazed, welded, or otherwise permanently affixed to the window. Alternatively, the baffle housing can be, for example, bolted, snap fitted, epoxied with non-curing epoxy, attached with releasable locking elements, and so forth to provide removable positioning relative to the window.

The plurality of baffle elements can each be affixed between positions on the baffle housing by suitable means. In an exemplary embodiment, at least two points of the leading edge of each baffle element can be affixed between positions on the baffle housing by suitable means. For example, the baffle elements can be affixed to the baffle housing by the use of epoxy, soldering, brazing, and so forth. Further, the baffle elements can be disposed in grooves or tracks formed in the baffle housing by suitable means, such as grinding, machining, electron discharge machining (EDM), and so forth. In an exemplary means, an electron discharge machine forms a groove in the baffle housing to receive the ends of the leading edge of the baffle element, which are then affixed to the baffle housing by epoxy.

In the exemplary embodiment illustrated, each baffle element is affixed between positions on the baffle housing such that the baffle elements are offset from the first surface of the window. In an alternative embodiment, the baffle elements can contact the first surface of the window. However, when the first surface of the window has an anti-reflective coating disposed thereon, caution should be used to minimize and/or prevent scratching of the anti-reflective coating by the baffle elements and/or the baffle housing.

Each of the plurality of baffle elements has a leading edge and an opposing trailing edge and is substantially straight from the leading edge to the trailing edge. As shown in the exemplary embodiment of FIG. 2, the leading edge 216 is oriented toward the first surface 204 of the window 206 and the trailing edge 218 is oriented with an angle ($\theta$) to scatter the incident rays of light. The angle $\theta$ is defined as the angle between the first surface 204 of the window 206 and the surface 214 of the baffle element 212.

The plurality of baffle elements 212 are non-uniformly oriented with each baffle element having an angle $\theta_i$ different from the angle $\theta_{i+1}$ of at least one of the remaining baffle elements. In an exemplary embodiment, the angle $\theta$ is such that the trailing edge 218 of each baffle element 212 is oriented to point toward a central point 220, defined by a point of rotation associated with the optical system, e.g., corresponding to an optical gimbal of a mounted source, an optical center point from which emission from the optical system occurs, or an optical point source corresponding to an optical system. Thus, the angle $\theta$ associated with each baffle element is different.

The angle $\theta$ for particular baffle element positions can be pre-determined. For example, in a segmented window with an optical system having a laser as a source, laser reflections occur at discrete angles from one window segment to an adjacent window segment. The laser reflections can be calculated and are a function of these discrete angles, the geometries of the window, and the position of the laser and the laser characteristics. Therefore, once the geometry of a particular window is fully modeled, a series of baffles can be designed to intercept the laser reflections and prevent any stray energy from escaping. For example, a computer program can be generated to perform the iterative calculations based on the window geometry and the laser information.

Wavelengths of radiation (e.g., reflected rays of light from the interaction of the optical system and the window or rays of light transmitted through the window to the optical system), can be incident on the baffle assembly and can be extinguished. Extinguishment can be either absorption of the energy (e.g., the coating on the baffle elements absorb at least a portion of the energy), and/or reflection to a second interaction with a window baffle with the attendant further absorption of energy. The surface of the baffle element is coated with a suitable energy absorbing coating. For example, the coating can be an ultraflat paint such as that available from Sherwin-Williams under the product name KRYLON® 1602 ultraflat black paint, or other suitable coatings.

In the exemplary embodiment shown in FIG. 2, a multi-element (e.g., two or more element) segmented window with a FLIR system was considered. An aperture element 222 for the optical system 210 is positioned on an axis 224 relative to the central point 220 of the optical system 210. The optical system 210 can be one or more of a sensor and a laser. The semi-circle 226 is a representation of the maximum extent the aperture element 222 extends toward the window 206 through various elevations of the optical system.

The portion of the window associated with the baffle housing can be determined by the mission and environment of use for the baffle window assembly. For example, the mission of the depicted FLIR system was forward and downward viewing. As such, two of the depicted window segments have a geometry that results in reflected stray laser radiation. Accordingly, the position and orientation of the baffle elements can be designed to be placed on the upper and forward fields of view (e.g., the upper and forward segments of the window) and in the filed of view of the optical system (e.g., the FLIR system) to have a minimal impact on optical system performance.

The number of individual baffle elements in the window baffle assembly can be altered to cause a minimal impact on the source and/or the sensor of the optical system. Although any number of baffles can be chosen to prevent radiation (e.g., laser energy) from escaping, the impact to optical system performance is significantly different for each design. The impact can be realized as a transmission loss, which varies across the vertical field of view (VFOV) of the display. This transmission loss can also vary with elevation and roll. To alter the noticeable effect to the operator, the window baffle assembly can cause a near uniform transmission loss across the entire FOV. If the loss in transmission is uniform across the VFOV, then the effect will appear as a loss in global transmission that can be uniform or substantially uniform across the whole field of view (i.e., substantially not varying with angle or varying only ±<5% variation in amplitude of the transmission loss). However, if the blockage is non-uniform across the VFOV then the effects will be seen as a gradient who's strength (S) is proportional to the transmission loss (α) times the temperature difference (ΔT) of the baffle to that of the scene:

$$S \propto \alpha \Delta T \qquad \text{Eq. 1}$$

Additionally, the loss in transmission due to the window baffle assembly can have a periodic character across the field angle. This periodicity is a phenomenon caused by the baffle assembly and is related to the number, spacing, and characteristics of the baffle elements. In the extreme, the periodicity can have a large amplitude suggesting correlation to each baffle and to a number of baffles. In general, the larger and more blocking the baffle elements, the more impact on the transmission loss and the more extreme the amplitude and the periodicity.

Figure 3:
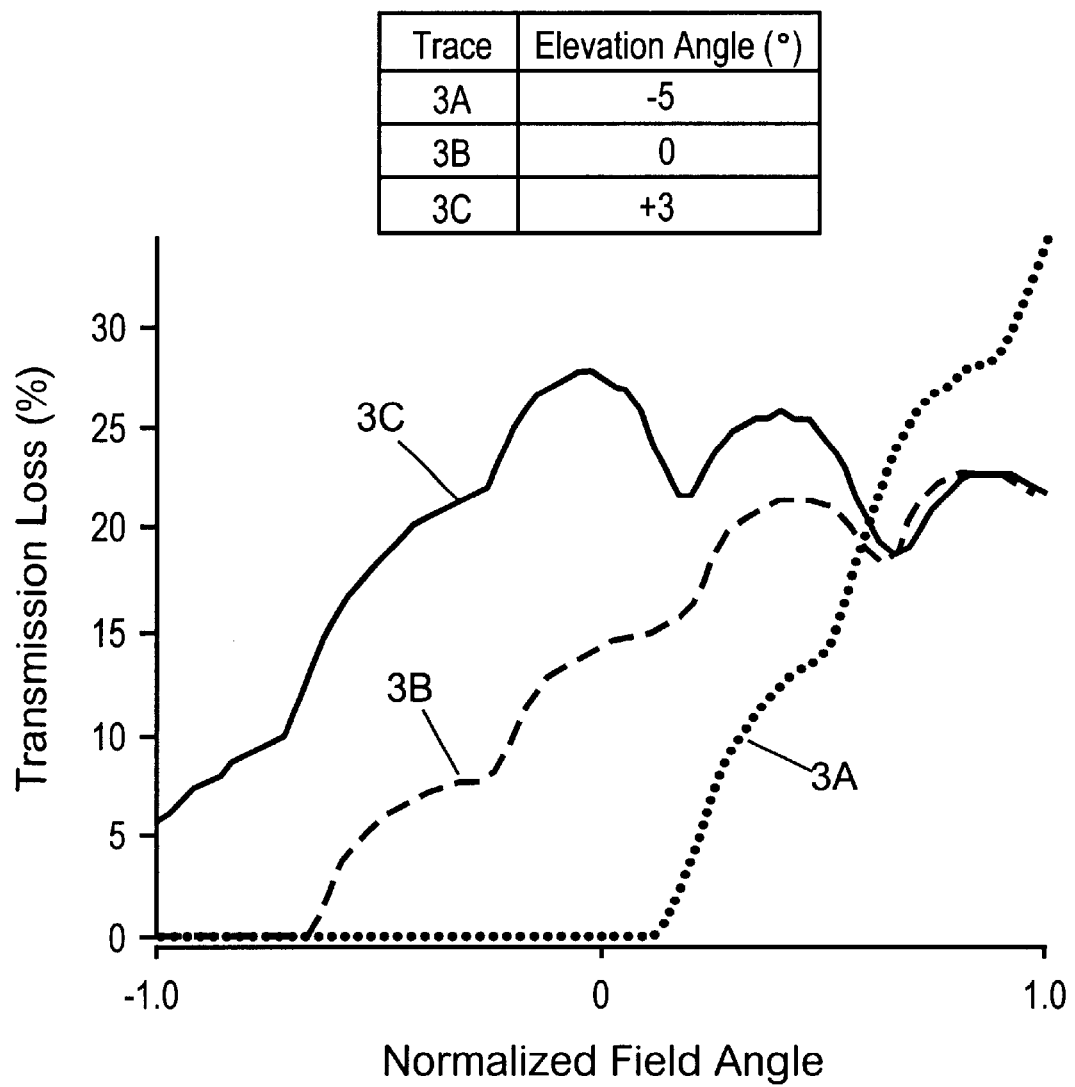
FIG. 3 is a plot of transmission loss as a function of normalized field angle across three elevations for an exemplary embodiment of a window baffle assembly.
Figure 4:
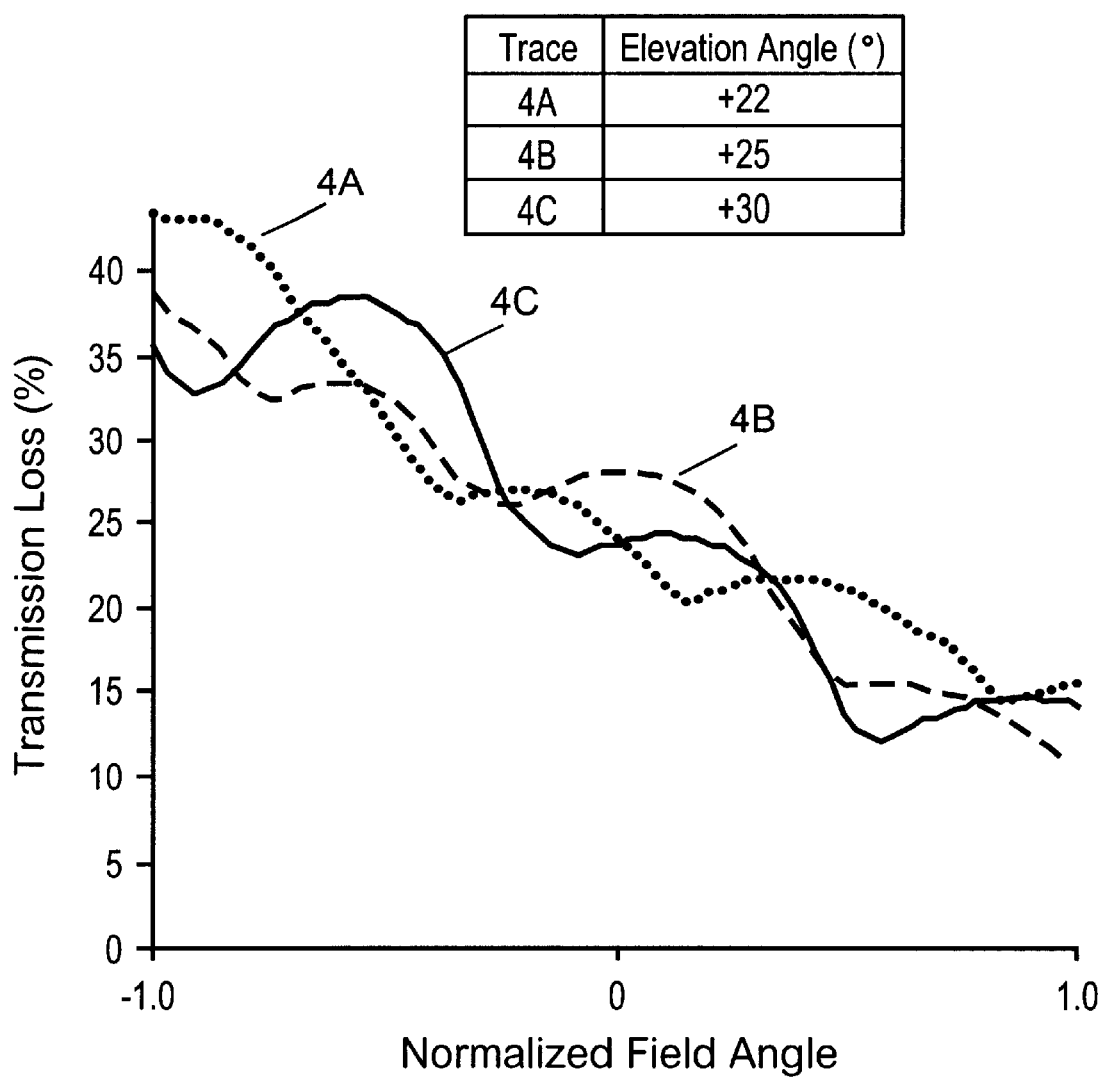
FIG. 4 is an additional plot of transmission loss as a function of normalized field angle across three elevations for an exemplary embodiment of a window baffle assembly.

In a first embodiment of the window baffle assembly considered here, the baffle elements were hand machined. FIGS. 3 and 4 are plots showing the transmission loss in a hand machined baffled window assembly. The baffle assembly had thirteen baffle elements and was tested over six different elevation angles varying from −5° to +30°. FIGS. 3 and 4 present the transmission loss (in percent) along the y-axis and the Normalized Field Angle (i.e., the vertical position on the display) along the x-axis in degrees. Normalized field angles less than zero correspond to the lower half of the display indicating looking below the 0° axis of the sensor. Likewise, field angles greater than zero correspond to the upper half of the display indicating looking above the 0° axis of the sensor.

Trace A indicates that the baffle elements cause no measurable effect on transmission loss in the lower half of the display when looking 5° down (−5°). However, the upper half of the display has a graduated transmission loss from zero to thirty-five percent. This would be perceivable by the operator with only a moderate difference in baffle temperature from that of the scene in view. As the elevation angle increases (as indicated in FIG. 3 by Trace 3B and 3C corresponding to 0° and +3°, respectively), the normalized field angle at which transmission loss first occurs becomes more negative, with a minimum of at least 5% transmission loss when the elevation angle is +5° or greater.

The three traces in FIG. 4 indicate a non-uniform transmission loss across the range of field angles with a general trend of lowering transmission loss as the field angle becomes more positive. In general, the transmission loss displays some periodic variation as the field angle changes with an amplitude of approximately 5% blockage. This variation is a result of the interference pattern formed by the baffle elements. In the embodiment of a baffle assembly using thirteen baffle elements, three strong periods can be resolved which can be correlated to the thirteen baffle elements.

As an alternative to the hand machining, Electron Discharge Machining (EDM) can be used to manufacture the baffle elements of the window baffle assembly. With this technique, the manufacture of multiple small and precisely engineered baffle elements can be achieved. The baffle elements can be any suitable length and thickness. For example, window baffle assemblies with various baffle element characteristics can be manufactured using EDM techniques. Table 1 summarizes the characteristics of baffle elements in different embodiments of the window baffle assembly. The different embodiments are presented as examples and were tested to determine trends in window baffle assembly performance when the number, length and thickness of the baffle elements were varied.

TABLE 1

| Assembly | Baffle Element Thickness(mils) | Baffle Element Length (mils) | Number of Baffle Elements |
| --- | --- | --- | --- |
| A | 15 | 150 | 53 |
| B | 10 | 150 | 54 |
| C | 5 | 150 | 55 |
| D | 12 | 200 | 48 |

Various window baffle assemblies were manufactured, tested, and their transmission loss performance as a function of normalized filed angle recorded. FIGS. 5–8 are plots of transmission loss (%) as a function of Normalized Field Angle for window baffle assemblies manufactured by an EDM technique with the characteristics of Assembly A, B, C and D, respectively.

Figure 5:
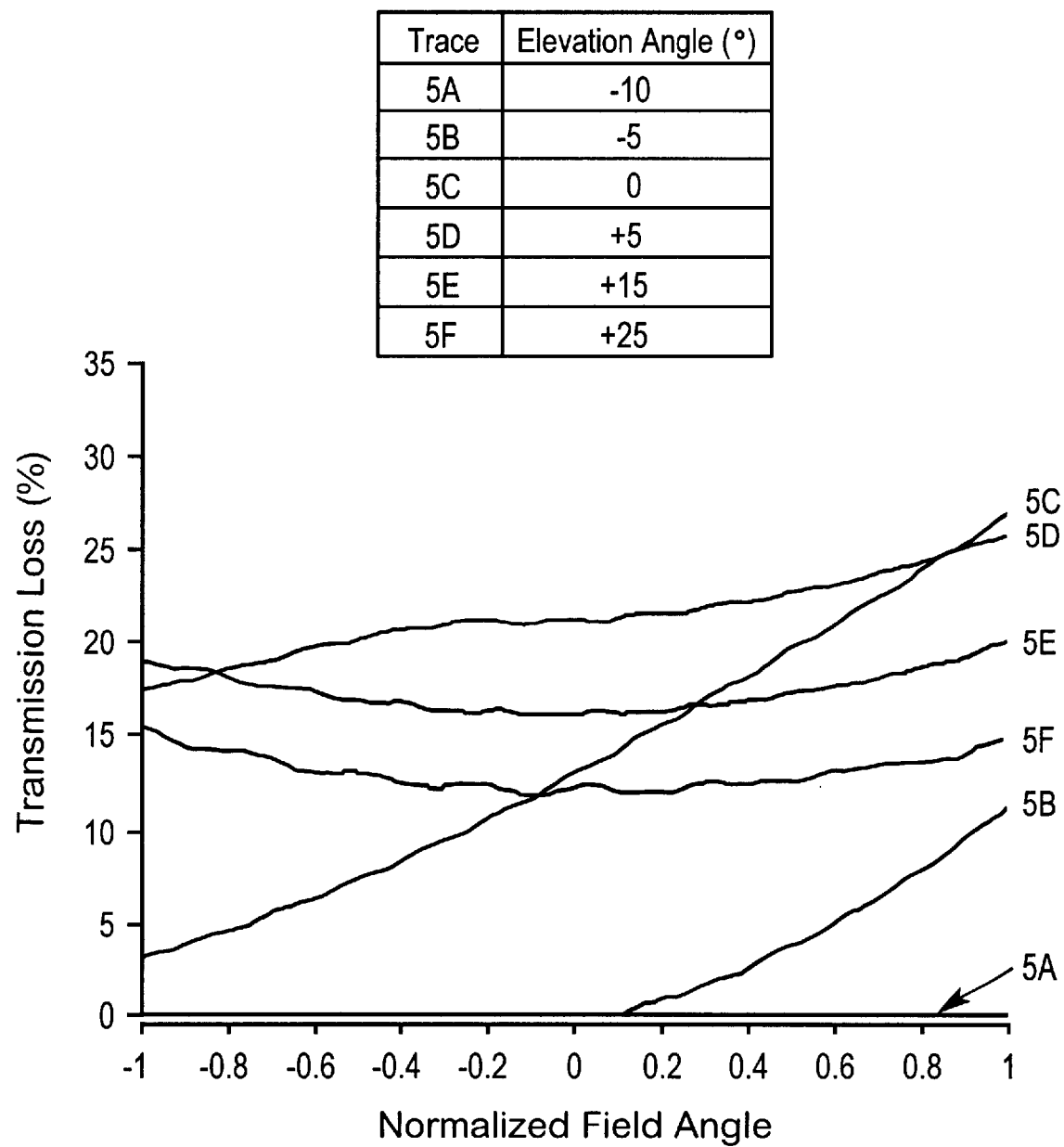
FIG. 5 is a plot of transmission loss as a function of normalized field angle across six elevations for an exemplary embodiment of a window baffle assembly.

FIG. 5 presents six traces (5A–5F) corresponding to elevation angles increasing from −100 to +25°. Fifty-three baffle elements were manufactured using EDM techniques. The baffle elements were 15 mils in thickness and 150 mils in length. Trace 5A indicates that the baffle elements cause no significant effect (i.e., measurable) on transmission loss across the display as the normalized field angle varies. Trace 5B indicates that the baffle elements cause no effect on transmission loss in the lower half of the display when looking 5° down. However, the upper half of the display has a graduated transmission loss from zero to approximately 10 percent. This would be perceivable by the operator with only a moderate difference in baffle temperature from that of the scene in view. Above an elevation angle of at least +5°, every normalized field angle is impacted with at least some transmission loss across the normalized field angle range, i.e., across the range from −1 to +1. However, Traces 5D to 5F indicate that the transmission loss occurs within a narrow band from approximately 12% to approximately 25% across the majority of the normalized field angle range. Additionally, traces 5E and 5F indicate a more uniform transmission loss across the normalized field angle range of approximately 12% to 19%, with the variation at any one elevation angle, the elevation angle being at least 15°, being less than 5% variation in transmission loss, such as less than 3% variation in transmission loss.

Figure 6:
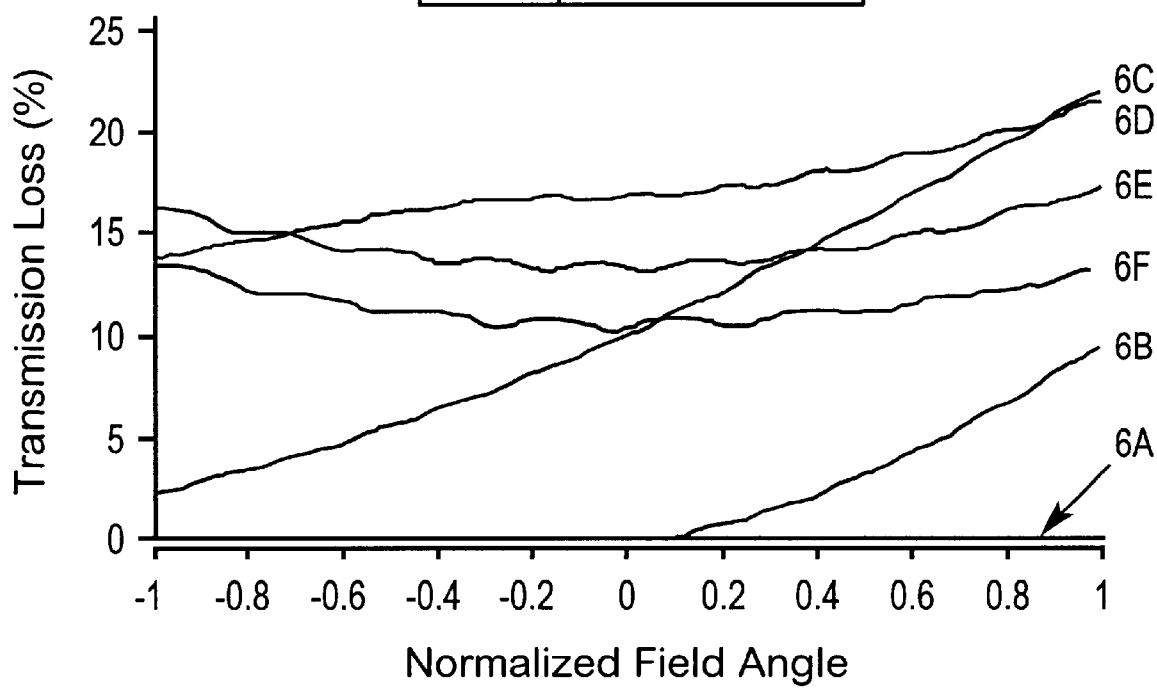
FIG. 6 is a plot of transmission loss as a function of normalized field angle across six elevations for an exemplary embodiment of a window baffle assembly.
Figure 7:
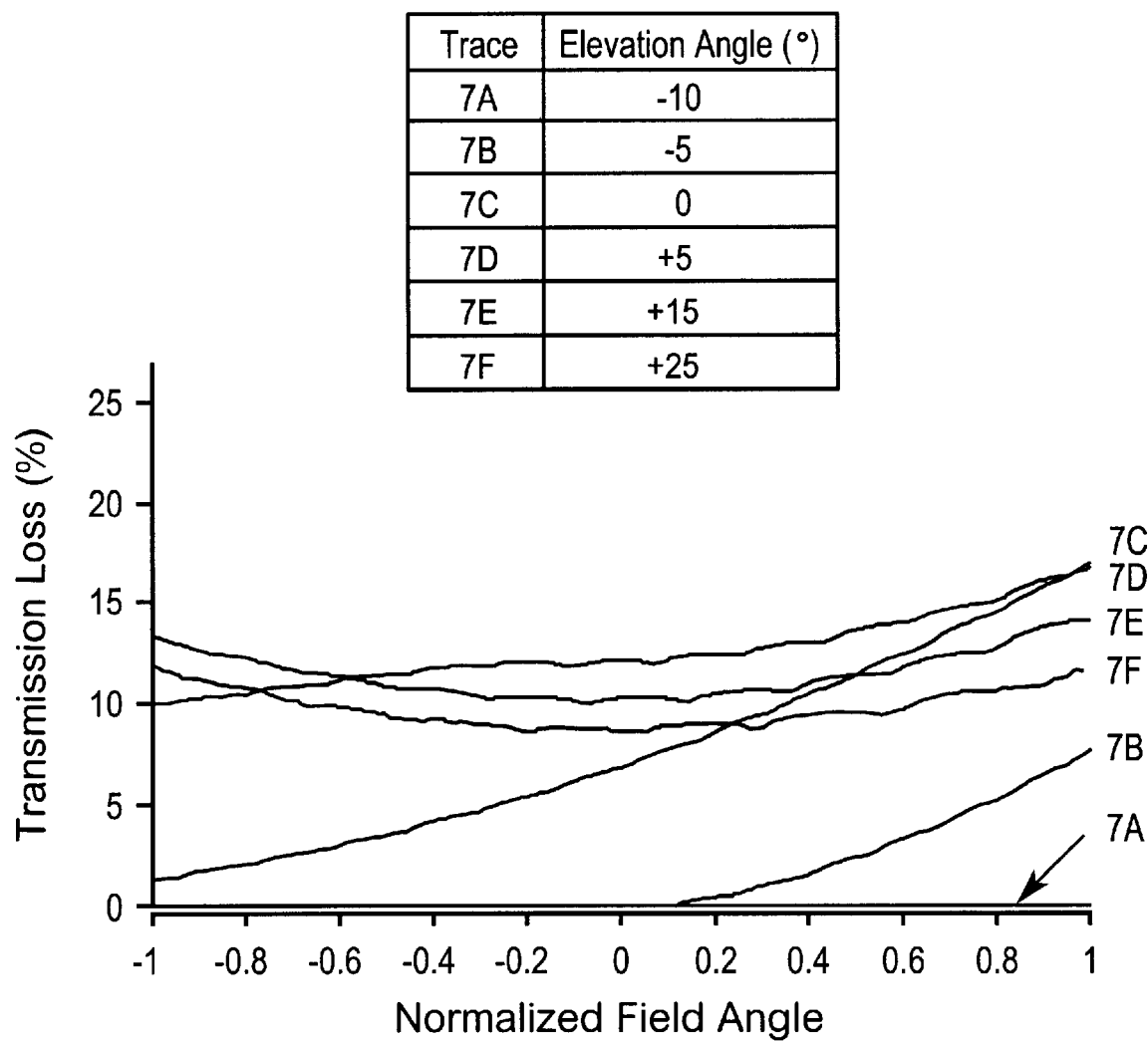
FIG. 7 is a plot of transmission loss as a function of normalized field angle across six elevations for an exemplary embodiment of a window baffle assembly.
Figure 8:
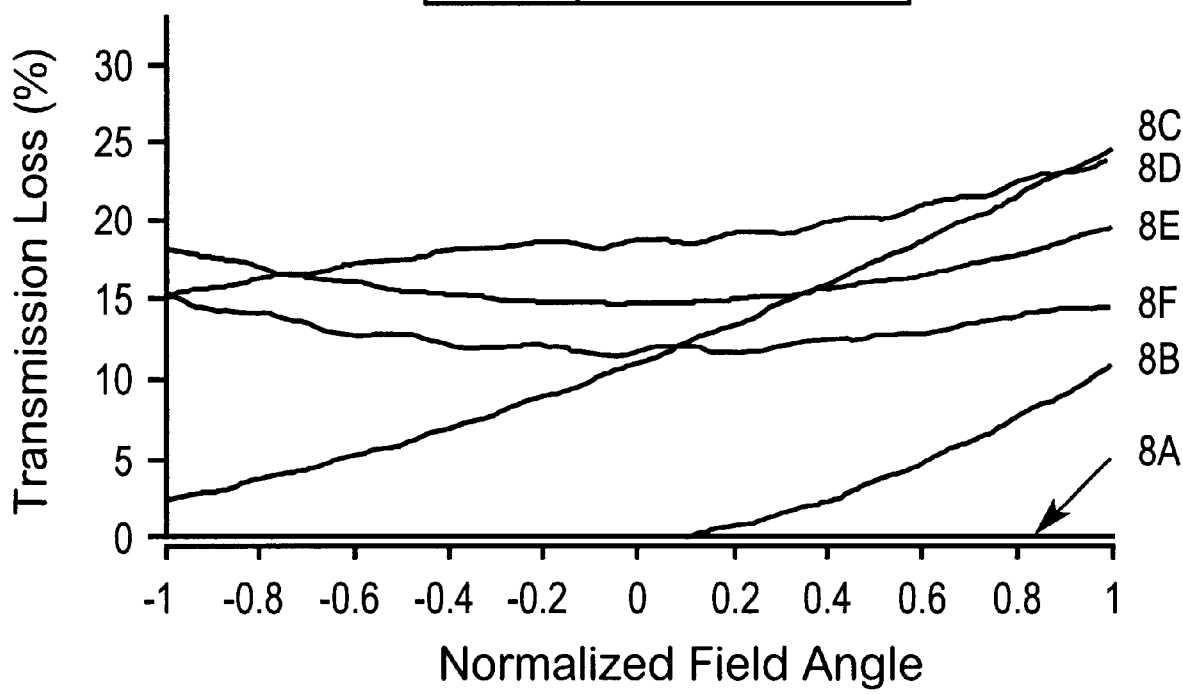
FIG. 8 is a plot of transmission loss as a function of normalized field angle across six elevations for an exemplary embodiment of a window baffle assembly.

Similar observations and descriptions of the traces in FIGS. 6–8 can be made.

Additionally, the EDM technique allows the baffle elements to be designed more uniformly, resulting in a more uniform transmission loss.

In addition to the above observations, the amplitude of the transmission loss of the EDM manufactured baffle elements is reduced from the hand machined baffle elements. In contrast to 5% variation in amplitude of the transmission loss for the hand machined baffle elements, the EDM manufactured baffle elements have an amplitude of approximately 2%, such as less than approximately 1%. Further, the EDM baffle elements result in an approximately uniform transmission loss across the normalized field angle range. For example, the 7E and 7F traces varied in transmission loss across the normalized field angle range by less than 3%, such as less than 2%. The general trend was to more uniform transmission loss profiles with increasing elevation angle.

In general, more and smaller baffles improves the transmission performance through elevation and normalized field angle. For example, as the length of the baffle element is reduced, e.g., as the distance from the leading edge to the trailing edge is reduced, the number of baffle elements in a given distance of the baffle housing increases proportionally. Further, the uniformity of the transmission loss increases and the mean transmission loss decreases. In another example, as the thickness of the baffle element is reduced, the number of baffle elements in a given distance of the baffle housing increases less than proportionally. Further, the uniformity of the transmission loss decreases and the mean transmission loss increases.

Extrapolating the observations from FIGS. 5–8, a baffle can be one with infinite elements that are infinitesimally small. However, using an increased number of relatively small sizes can reduce the strength of the window baffle assembly. Increasing structural stability of the window baffle assembly and baffle elements under operational strain by, for example, structural reinforcement, can impact performance impact to the optical system. However, exemplary embodiments of the present invention can permit the impact to optical system performance to be nearly uniform across the FOV, with a small impact to the overall transmission of the optical system.

Considering the FOV impact and the desired structural stability and optical performance, a window baffle suitable for aviation applications was developed. The thickness of the baffles was primarily determined by manufacturing requirements. For example, the EDM process can use a wire of a predetermined size to machine a substrate, e.g., a 12 mil wire. This correspondingly results in baffle elements having a thickness of not less than the predetermined wire size, e.g., 12 mils. From a performance point of view, a thinner baffle is can be used. However, as the baffle element becomes thinner, its structural strength can be reduced for a given material. One way reduced structural strength is realized is in increased flexure of the baffle element. Accordingly, the baffle element can be reinforced by a reinforcing element, for example, a rib joining all the baffle elements. In the exemplary embodiment shown in FIG. 1, a reinforcing element 116 is joined (e.g., connected) to the baffle elements 112 at a point between portions (e.g., two points 118, 120) at which the baffle elements 112 are affixed to the baffle housing 110 (e.g., the reinforcing element is a central rib positioned midway or approximately midway between the edges of the baffle elements that are affixed to the baffle housing. The reinforcing element can run substantially perpendicular to the baffle element orientation. Reinforcing elements can result in reduced flexure of the baffle elements during operation within a designated performance profile. For example, for a SNIPER-XR® targeting pod manufactured by Lockheed Martin, the use of a reinforcing element in the form of a central rib can result in less than 2 mils of maximum baffle element deflection under a 5A load.

The length of the baffles in exemplary embodiments was no more than 250 mils. However, adapting the window baffle assembly to other platforms can change the baffle length accordingly.

A baffle length in an exemplary window baffle can be 200 mils, assuming 12 mil thickness and 25% overlap in length. This design balanced uniformity and low transmission loss across the FOV of the sensor with structural stability. The overlap of 25% can limit the maximum deflection to 2 mils and can allow for manufacturing tolerances since the window baffles can abut the window face and there is a 1/16-inch gap between the window face and the baffle.

Table 6 shows the x-position, y-position, slope and length of each baffle in an embodiment in keeping with the present invention. These positions correspond to a set of axes that is centered at the seam of the window. Each baffle element aims directly back towards the central point of rotation of the optical gimbal.

TABLE 6

| Baffle Information | | | |
|---|---|---|---|
| X position | Y Position | Slope | Length |
| 0 | 0 | 0 | 0.2 |
| −0.130443142335455 | 0.0913372715710423 | 0.00937288356986238 | 0.2 |
| −0.265284397084579 | 0.185754134608037 | 0.019327419486068 | 0.2 |
| −0.399564472351832 | 0.279778055541535 | 0.029518093544858 | 0.2 |
| −0.533256979226914 | 0.373390556657619 | 0.0399488513039922 | 0.2 |
| −0.666334437019951 | 0.46657239577009 | 0.0506233784542365 | 0.2 |
| −0.798768256913815 | 0.559303554773685 | 0.0615450570940076 | 0.2 |
| −0.930528730046065 | 0.651563231298959 | 0.0727169188728154 | 0.2 |
| −1.0615850207539 | 0.743329833982391 | 0.0841415950983212 | 0.2 |

TABLE 6-continued

Baffle Information

| X position | Y Position | Slope | Length |
|---|---|---|---|
| −1.19190516576575 | 0.834580981900271 | 0.0958212639723139 | 0.2 |
| −1.32145608016767 | 0.925293508746457 | 0.107757595202093 | 0.2 |
| −1.45020357100919 | 1.01544347235927 | 0.119951692325442 | 0.2 |
| −1.57811235943905 | 1.10500617022113 | 0.132404033189242 | 0.2 |
| −1.70514611227306 | 1.19395616156258 | 0.145114409132599 | 0.2 |
| −1.8322507241494 | 1.28295576893961 | 0.15818434748519 | 0.2 |
| −1.95974839509128 | 1.37223059923729 | 0.171659179765954 | 0.2 |
| −2.0879790987976 | 1.46201870460239 | 0.18559013451429 | 0.2 |
| −2.21660110510868 | 1.55208080300107 | 0.199955661861341 | 0.2 |
| −2.34560999375125 | 1.64241379932466 | 0.21476948074969 | 0.2 |
| −2.47500038082609 | 1.73301392372633 | 0.230045239783221 | 0.2 |
| −2.60476581750657 | 1.82387666068908 | 0.245796414533742 | 0.2 |
| −2.7348986846066 | 1.91499667520136 | 0.262036189183496 | 0.2 |
| −2.86539008392782 | 2.00636773667761 | 0.27877732140784 | 0.2 |
| −2.99622972759949 | 2.09798264147319 | 0.296031989584668 | 0.2 |
| −3.12740582697434 | 2.1898331350884 | 0.313811621687326 | 0.2 |
| −3.25848167540684 | 2.28161343223808 | 0.33206694926222 | 0.2 |
| −3.38985926912547 | 2.37360501371172 | 0.350862924349676 | 0.2 |
| −3.52152171573196 | 2.46579605132471 | 0.370207373935459 | 0.2 |
| −3.65345025400614 | 2.55817340832928 | 0.390106530286247 | 0.2 |
| −3.78515655230838 | 2.6503951512302 | 0.410491474965193 | 0.2 |
| −3.91707918735966 | 2.7427683747536 | 0.43143305100821 | 0.2 |
| −4.04870240195578 | 2.8349319418172 | 0.452850208336215 | 0.2 |
| −4.18048467110341 | 2.92720688007675 | 0.474816170738761 | 0.2 |
| −4.31188169040429 | 3.01921206348951 | 0.497236296636783 | 0.2 |
| −4.44337358685668 | 3.11128368059896 | 0.520186013433217 | 0.2 |
| −4.57438673918747 | 3.2030200774656 | 0.54355584931406 | 0.2 |
| −4.70487035936966 | 3.29438569193005 | 0.567321408970407 | 0.2 |
| −4.85552711674131 | 3.39987668912394 | 0.595353694309255 | 0.2 |
| −5.01632746491004 | 3.51247030505841 | 0.625948707276283 | 0.2 |
| −5.18452559411107 | 3.63024390303774 | 0.658660572455029 | 0.2 |
| −5.3582424424691 | 3.75188174977207 | 0.69315743665897 | 0.2 |
| −5.5369744469808 | 3.8770312466505 | 0.7293411765225 | 0.2 |
| −5.72006235488584 | 4.00523077992065 | 0.767054170382094 | 0.2 |
| −5.9066774562393 | 4.13590008063211 | 0.806073022290431 | 0.2 |
| −6.09696559369975 | 4.2691412689138 | 0.846351041307498 | 0.2 |
| −6.28985579142289 | 4.40420443940631 | 0.887560272623947 | 0.2 |
| −6.4840993375652 | 4.54021523466374 | 0.929308483235193 | 0.2 |
| −6.67963946331844 | 4.67713390473863 | 0.971443098852403 | 0.2 |

Although described herein as being from 5 to 12 mils in thickness, the baffle element can be any suitable thickness that is determined by, for example, a balance between performance, manufacturability, cost and structural integrity.

Figure 9:
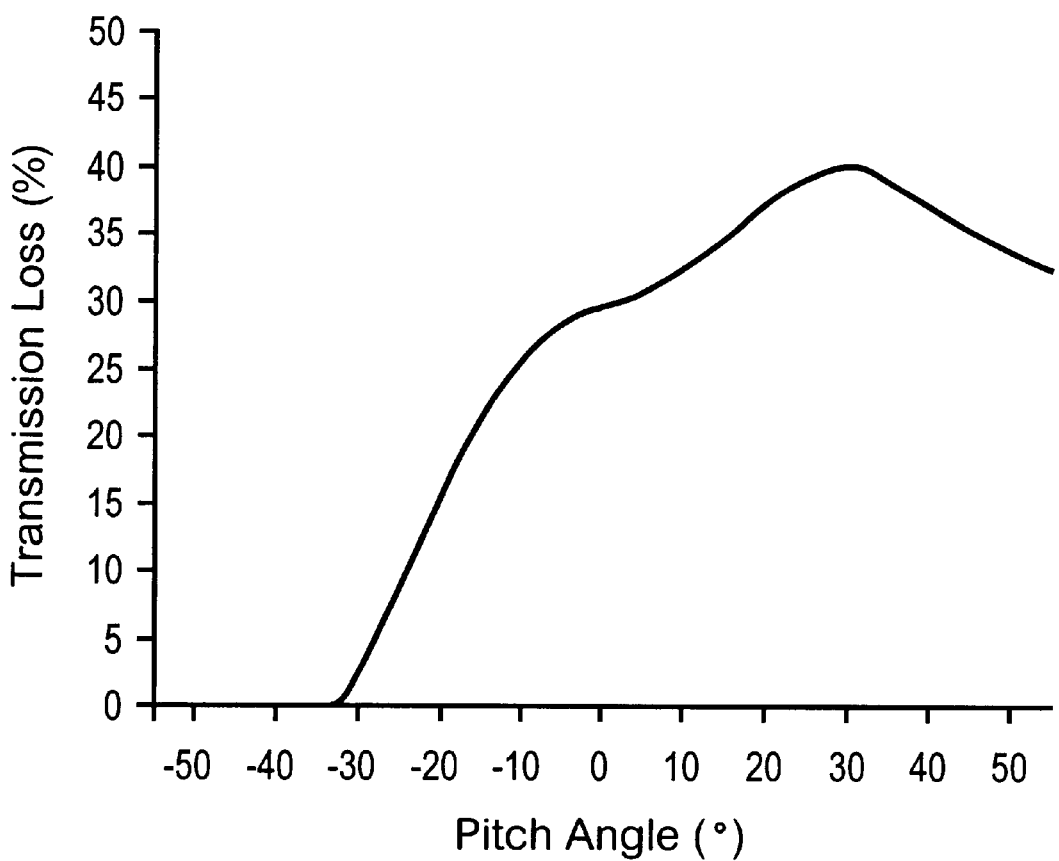
FIG. 9 is a plot of the loss in laser energy as a function of pitch angle in an exemplary embodiment of a window baffle assembly.

FIG. 9 is a plot of the transmission loss in % (e.g., loss in laser energy) as a function of pitch angle and represents the reduction in optical system output (e.g., laser output) resulting from placement of and interaction with a window baffle assembly in keeping with the invention placed in the FOV of the laser. Since the laser is using the entire 5-inch aperture there will be no change in transmission across the FOV and the single trace represents all elevation angles. Non-uniformity in the laser energy an be tolerated if within an acceptable loss for a desired application. For example, for an air to ground application, the lower pitch angles are predominately used. From FIG. 9, loss in laser energy is negligible below approximately 30° and is less than approximately 25% at approximately −10°. Therefore, the loss represented in FIG. 9 can be acceptable for this application.

The use of baffles in a segmented window can minimize stray laser radiation from exiting the optical system while at the same time have minimal impact on system performance. Although any properly designed baffle could perform this function, to minimize the impact to the optical system operator and performance, both manufacturing constraints and structural constraints need to guide the development of a window baffle assembly.

A method of manufacturing a window baffle assembly comprises the steps of determining a plurality of reflections associated with a wavelength of radiation, forming a plurality of baffle elements having a length from a leading edge to a trailing edge, and positioning a plurality of baffle elements proximate a first surface of at least a portion of a window such that the trailing edge of each baffle element overlaps the leading edge of an adjacent baffle element by at least a predetermined percentage of the distance from the leading edge to the trailing edge. The plurality of baffle elements are positioned such that each is oriented to scatter incident radiation while a mean transmission loss is less than 25%.

The plurality of baffle elements can be formed by any suitable means, such as by machining, grinding, or electron discharge machining.

The method can further comprise a step of joining a center section of each of the plurality of baffle elements with a reinforcing element such that a deflection distance of any one baffle element is no greater than a predetermined value. Still further, the method can comprise a step of affixing the baffle elements to a baffle housing about a perimeter of the window.

The surface of the baffle elements can be adapted to absorb at least a portion of the energy of the radiation incident thereon. For example, the surface can be coated with an energy absorbing coating and/or roughened to a predetermined surface roughness.

Although the present invention has been described in connection with exemplary embodiments thereof, it will be appreciated by those skilled in the art that additions, deletions, modifications, and substitutions not specifically described may be made without departing from the spirit and scope of the invention as defined in the appended claims.

What is claimed is:

1. A window baffle assembly comprising:

a multi-element segmented window having a first surface, the first surface receiving at least one wavelength from an optical system;

a baffle housing positioned proximate at least a portion of the first surface of the window; and a plurality of baffle elements each affixed between positions on the baffle housing and offset from the first surface of the window, each baffle element comprising a surface, the surface absorbing at least a portion of the energy of the radiation and oriented to scatter the radiation, wherein each baffle element comprises a leading edge and an opposing trailing edge, the leading edge of each baffle oriented toward the first surface of the window and the trailing edge of each baffle oriented to point toward a central point defined by a point of rotation of the optical system.

2. The window baffle assembly of claim 1, wherein and a portion of the leading edge of each baffle element is affixed to the baffle housing.

3. The window baffle assembly of claim 1, wherein the surface of each baffle element is coated with an energy absorbing coating.

4. The window baffle assembly of claim 1, wherein the surface of the baffle element has a desired surface roughness to scatter the radiation.

5. The window baffle assembly of claim 1, wherein at least a portion of the baffle elements are in a field of view of the optical system.

6. The window baffle assembly of claim 1, comprising a reinforcing element joined to each of the baffle elements and to the baffle housing.

7. The window baffle assembly of claim 6, wherein the reinforcing element is joined to the baffle elements at a point between the positions at which the baffle elements are affixed to the baffle housing.

8. The window baffle assembly of claim 1, wherein the window baffle assembly has at least 48 baffle elements.

9. The window baffle assembly of claim 1, wherein a length of a surface of each baffle element from the leading edge to the trailing edge is from 50 to 500 mils.

10. The window baffle assembly of claim 1, wherein a thickness of each baffle element is from 3 to 50 mils.

11. The window baffle assembly of claim 1, wherein each baffle element is no greater than 15 mils thick.

12. The window baffle assembly of claim 1, wherein the plurality of baffle elements are in a Field of View of the optical system at an operational angle.

13. The window baffle assembly of claim 1, wherein the optical system is a forward looking infrared laser system.

14. A window baffle assembly comprising:

a window having a first surface and a second surface, the first surface opposing an aperture of an optical system for transmitting and receiving radiation; and a plurality of baffle elements arranged on the first surface of the window such that a first wavelength is transmitted from the optical system through the baffle elements and the window and a second wavelength is transmitted through the window and the baffle elements to the optical system, wherein at least a portion of the baffle elements are in a Field of View of the optical system and each has a trailing edge oriented toward a central point of the optical system.

15. The window baffle assembly of claim 14, wherein a surface of each of the baffle elements absorbs at least a first portion of the first wavelength and a first portion of the second wavelength and the trailing edge of each of the baffle elements is oriented toward the central point of the optical system such that each of the baffle elements scatters at least a second portion of tie first wavelength and a second portion of the second wavelength.

* * * * *

UNITED STATES PATENT AND TRADEMARK OFFICE
CERTIFICATE OF CORRECTION

PATENT NO.   : 6,669,347 B2
DATED        : December 30, 2003
INVENTOR(S)  : Timothy Alderson et al.

It is certified that error appears in the above-identified patent and that said Letters Patent is hereby corrected as shown below:

<u>Column 11,</u>
Line 23, delete "and".

<u>Column 12,</u>
Line 37, change "tie" to -- the --.

Signed and Sealed this

Fifteenth Day of June, 2004

JON W. DUDAS
*Acting Director of the United States Patent and Trademark Office*